L. C. LASHMET.
WATER PURIFYING DEVICE.
APPLICATION FILED NOV. 14, 1914.

1,157,233.

Patented Oct. 19, 1915.
2 SHEETS—SHEET 1.

Witnesses
J. Milton Jester
J. E. Jackson

Inventor
Luther C. Lashmet
By
D. A. Gourick
Attorney

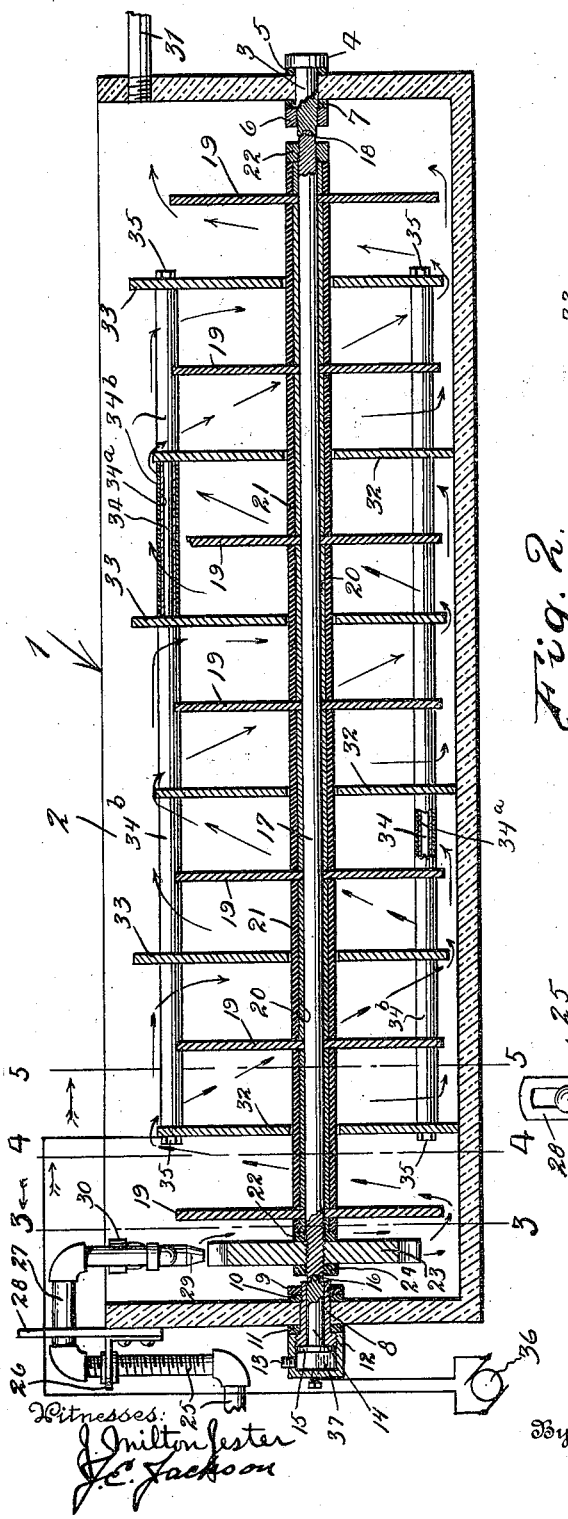
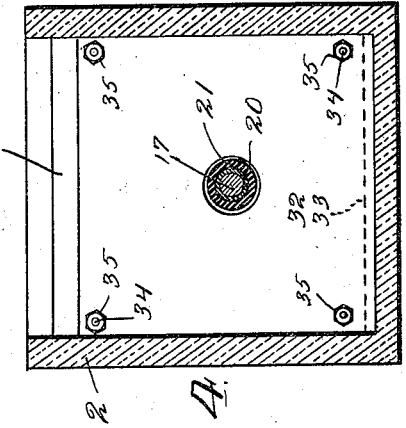
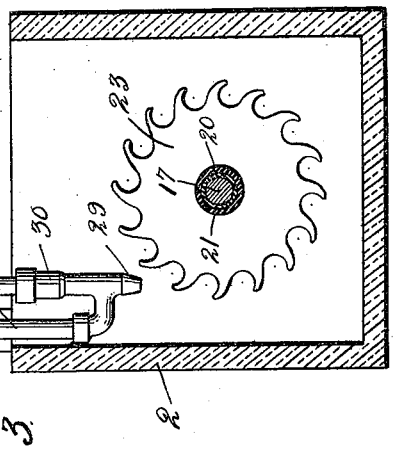

ically acted upon.
UNITED STATES PATENT OFFICE.

LUTHER C. LASHMET, OF JACKSONVILLE, ILLINOIS.

WATER-PURIFYING DEVICE.

1,157,233.  Specification of Letters Patent.  Patented Oct. 19, 1915.

Application filed November 14, 1914. Serial No. 872,172.

*To all whom it may concern:*

Be it known that I, LUTHER C. LASHMET, a citizen of the United States, residing at Jacksonville, in the county of Morgan and State of Illinois, have invented certain new and useful Improvements in Water-Purifying Devices, of which the following is a specification.

My invention relates to water purifying devices, particularly to that type employing electricity as the purifying agent, and has for its broad object the provision of an apparatus whereby water containing mineral salts in solution and contaminated by the presence of organic matter such as bacteria and germs, may be purified by the action of electricity and rendered fit for use.

The principle involved in the carrying out of my invention is that the action of an electric current passing through water containing mineral and organic matter decomposes or breaks up the water into its component gases, hydrogen and oxygen. Experiment has revealed the fact that the oxygen gas has a peculiar chemical action on the mineral and organic matter destroying the life of the organic matter and converting the mineral salts held in solution into other compounds insoluble in water, the hydrogen gas passing off into the air.

The apparatus employed in carrying out my invention consists of an electrolyzing device wherein the previously described principle may be applied, aerating means whereby the gases may be permitted to escape, and a settling tank wherein the refuse matter may be removed from suspension by sedimentation.

The specific object of my invention is the provision of a novel device wherein a continuous flow of impure water may be subjected to electrolysis while the influx of the water itself operates positive means for accomplishing the proper and continuous agitation of the water so that all of it may be thoroughly acted upon.

Figure 1:
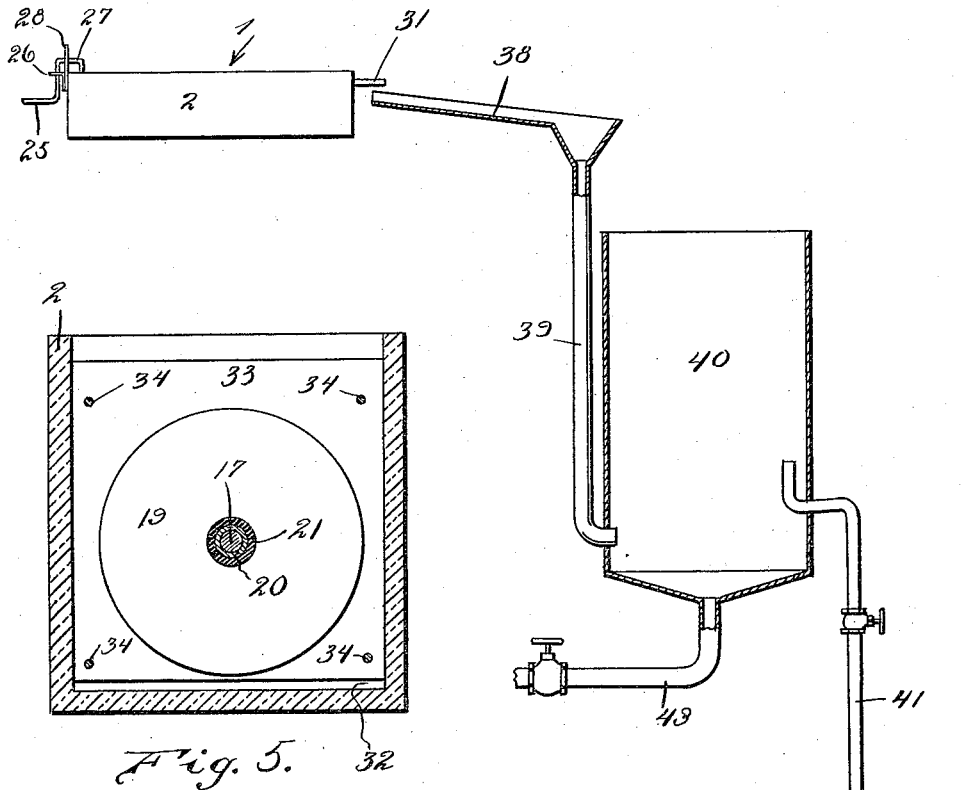
Figure 5:
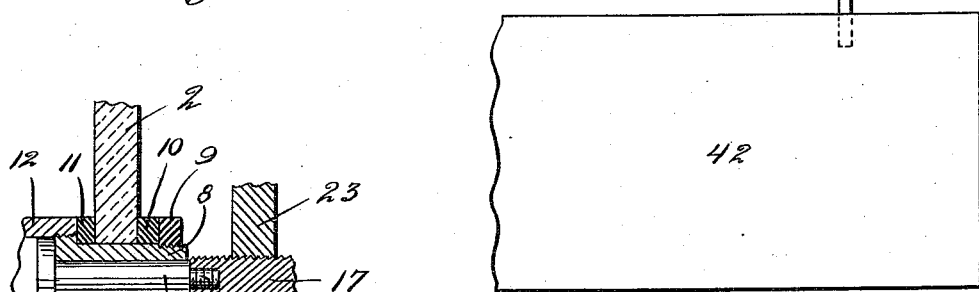
Figure 6:
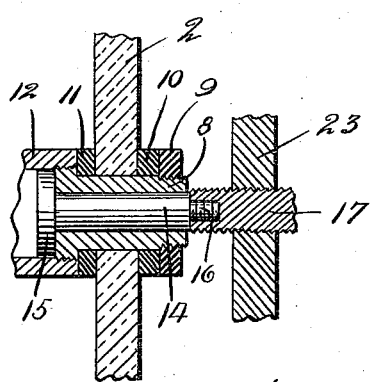

Other objects and advantages residing in the particular details of construction and arrangement of parts will be carefully brought out in the following description and illustrated in the accompanying drawings, in which:

Figure 1 is a view in elevation of my entire apparatus, Fig. 2 is a longitudinal sectional view through the electrolyzing device, Figs. 3, 4 and 5 are cross sectional views on the lines 3—3, 4—4 and 5—5 of Fig. 2, and Fig. 6 is a detail sectional view of one of the bearings.

Referring more particularly to the drawings, the numeral 1 designates the electrolyzing device as a whole, which comprises a preferably rectangular open-topped tank 2 formed of insulating material preferably glass.

Disposed through one end of the tank 2 is a member 3 having at its outer end a head 4 bearing against a washer 5, and having at its inner end a socket. The member 3 is held in place by a nut 6 threaded upon its inner end and bearing against a washer 7. A bushing 8 is disposed through the other end of the tank and is threaded upon its inner end for the reception of a nut 9 bearing against a washer 10. The head or outer end of the bushing 8 bears against a washer 11 which is also engaged by a cup 12 threaded upon the head of the bushing 8 for a purpose to be described, the cup 12 being provided with a hole closed by a plug 13. Revoluble within the bushing 8 is a spindle 14 prevented from inward movement by a head 15 and provided upon its inner end with a reduced screw-threaded extension 16. A shaft 17 is disposed longitudinally within the tank 2 and has at one end an extension 18 engaging within the socket in the member 3, and has at its other end a threaded socket engaging the extension 16 on the spindle 14. The shaft 17 is thus freely revoluble in relation to the tank.

Disposed upon the shaft 17 at regular intervals are electrodes 19 formed as circular metallic disks incapable of rotation on the shaft. These disks are held in their proper spaced relation by metallic sleeves 20 disposed upon the shaft, the sleeves 20 being covered by other sleeves 21 formed of insulating material. The ends of the shaft 17 are screw-threaded for the reception of nuts 22 engaging the endmost sleeves and locking the disks and sleeves securely together upon the shaft. The shaft 17 and the electrodes 19 constitute the movable portion of my electrolyzer.

In order that the shaft 17 carrying the electrodes 19 may be rotated, I provide a bucketed wheel 23 on the shaft 17 and clamped in place by a nut 24.

Water to be purified is admitted to the tank 2 through an inlet pipe 25 which is held in vertically adjustable relation to the tank by being threaded through a bracket 26 secured on the tank. The horizontal portion 27 of the inlet pipe passes through a vertically slotted guide 28 and communicates with a discharge nozzle 29 disposed to play upon the wheel 23, adjustment of the stream being effected by any suitable valve structure indicated at 30. A water outlet pipe 31 is provided at the upper portion of the other end of the tank.

The stationary electrodes comprise a plurality of metallic plates 32 and 33 arranged in alternation between the disks 19 and connected by metal rods 34 having nuts 35 upon their ends. These plates are held in their proper spaced relation by metallic sleeves 34$^a$ disposed upon the rods 34 and abutting against the successive plates, the sleeves 34$^a$ being covered by other sleeves 34$^b$ of insulating material. The plates 32 rest upon the bottom of the tank 2 while the plates 33 are spaced above the bottom and extend above the plates 32, the purpose being to cause the water in the tank to pursue a course indicated by the arrows, whereby perfect and complete circulation is maintained. The plates 32 and 33 are apertured as shown for the passage of the shaft 17 and the sleeves carried upon it.

The electric circuit comprises a suitable source of current 36 having one terminal connected with one of the rods 34 and its other terminal connected with the cup 12. Mercury 37 is placed within this cup through the opening closed by the plug shown and contacts with the head 15 of the spindle 14, consequently making complete connection through the shaft 17 and the disks 19. The current will of course pass through the water in the tank between the plates 19 and 32, and 19 and 33. The passage of the current decomposes the water into hydrogen and oxygen. The hydrogen gas passes off into the air while the oxygen gas acts upon the impurities in the water and kills off all bacteria and germs and converts all the dissolved mineral and organic matter into insoluble compounds. As the water rises in the tank the insoluble impurities will be carried with it out through the pipe 31. As the water leaves the pipe 31 it passes onto a flat sloping surface 38 where the gases will escape. After leaving the surface 38 the water enters a pipe 39 leading to a settling tank 40 where it is allowed to stand until the impurities fall to the bottom. The clear water is then drawn off through a valved pipe 41 into a suitable storage tank 42, while the impurities in the form of a sediment are drained off through a valved pipe 43 into a sewer or other suitable place.

Having thus described my invention what I claim is:

1. A water purifier comprising a tank of non-conducting material, a plurality of stationary electrodes therein, said electrodes being connected by rods, a shaft revoluble within said tank, and a plurality of electrodes on said shaft and disposed between said stationary electrodes, said sets of electrodes being connected with the terminals of a source of current.

2. A water purifier comprising a tank of non-conducting material, a plurality of stationary electrodes therein, rods connected with a source of current passing through and connecting said electrodes, a shaft revoluble within said tank and extending through said stationary electrodes and insulated therefrom, and a plurality of electrodes on said shaft and disposed between said stationary electrodes, said second named electrodes receiving their current from said shaft.

3. A water purifier comprising a tank of insulating material provided with outlet and inlet pipes, said inlet pipe having a nozzle on its inner end for causing a forced stream, a plurality of stationary metal plates disposed therein, a shaft journaled in said tank and extending through said plates and insulated therefrom, a plurality of metal plates on said shaft and disposed between said first named plates, said sets of plates being connected with the terminals of a source of current, and means for rotating said shaft, said means being operated by the flow of water into said tank through said nozzle.

4. A water purifier comprising a tank of insulating material provided with an outlet and an inlet pipe, said inlet pipe having a nozzle on its inner end for causing a forced stream, a plurality of stationary metal plates disposed therein, a shaft journaled in said tank and extending through said plates and insulated therefrom, a plurality of metal plates on said shaft and disposed between said first named plates, said sets of plates being connected with the terminals of a source of current, and means for rotating said shaft, said means comprising a water wheel secured on said shaft and disposed to be rotated by the flow of water from said nozzle.

5. A water purifier comprising a tank formed of insulating material, inlet and outlet pipes communicating with said tank, a plurality of spaced metallic plates within said tank and connected with each other, alternate ones of said plates resting upon the bottom of said tank and the other alternate ones being spaced above the bottom thereof, a shaft journaled in said tank and extending through said plates and insulated therefrom, a plurality of metallic disks secured upon said shaft and disposed between and in spaced relation to said first named plates, said sets of plates being connected with the terminals of a source of current and consequently having opposite polarity, and means for rotating said shaft.

In testimony whereof I hereto affix my signature in the presence of two witnesses.

LUTHER C. LASHMET.

Witnesses:
 EMMA C. DE CAMP,
 GEORGE H. BUSEY.

Copies of this patent may be obtained for five cents each, by addressing the "Commissioner of Patents, Washington, D. C."